Aug. 16, 1927.
H. S. SMALL
1,638,966
POULTRY FENCE ATTACHMENT
Filed Feb. 25, 1927
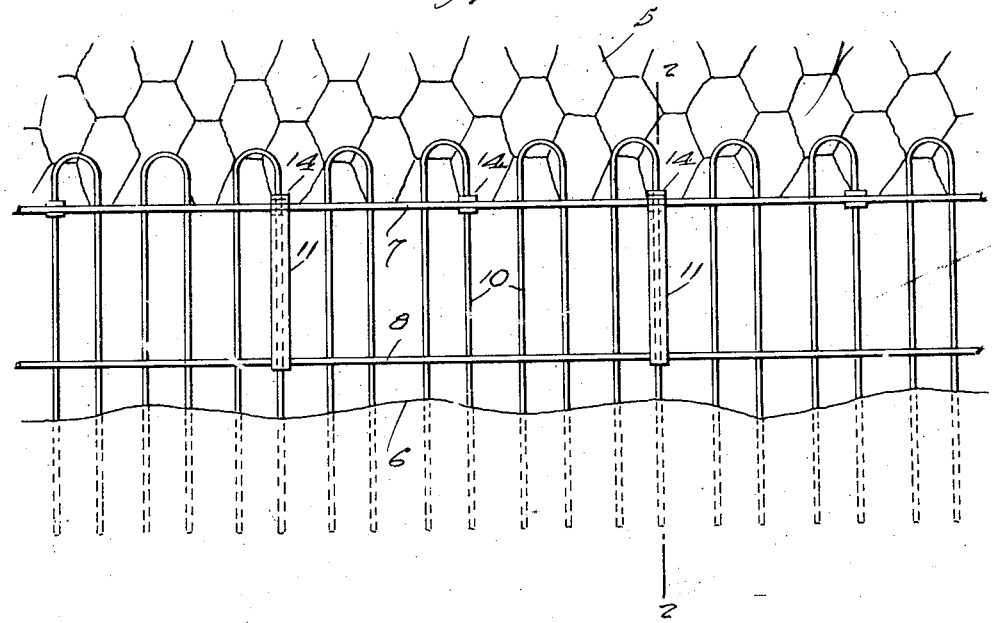
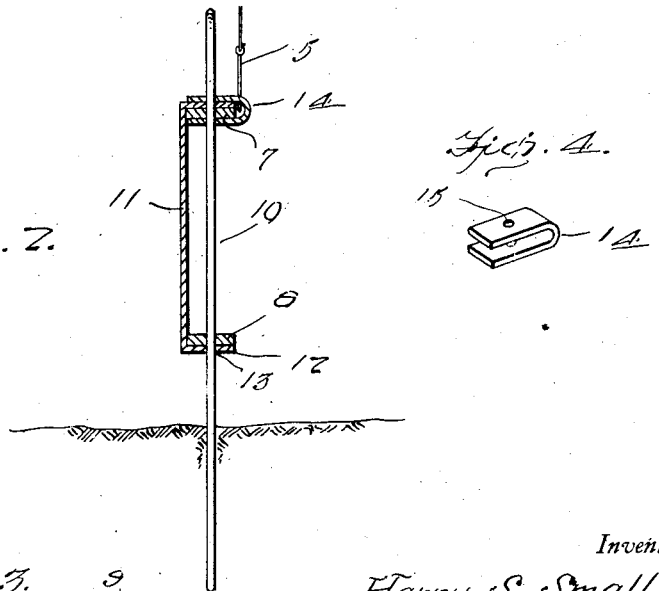
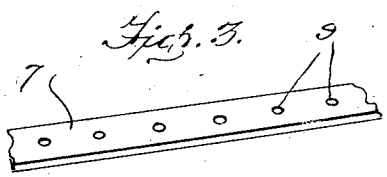
Inventor
Harry S. Small
By Clarence A. O'Brien
Attorney Patented Aug. 16, 1927.

1,638,966

UNITED STATES PATENT OFFICE.

HARRY STACY SMALL, OF SEABROOK, NEW HAMPSHIRE.

POULTRY-FENCE ATTACHMENT.

Application filed February 25, 1927. Serial No. 170,908.

The present invention relates to an attachment for the bottoms of poultry fences and has for its principal object to provide an attachment of this nature which may be engaged with the bottom of a poultry fence so that it will prevent chickens from escaping under the fence.

Another important object of the invention lies in the provision of an attachment of this nature at the bottom of a fence which has members that will move downwardly into the ground when holes are scratched below the fence by chickens thus preventing the escape of the chickens under the fence.

A still further important object of the invention lies in the provision of an attachment of this nature which is exceedingly simple in construction, inexpensive to manufacture, strong and durable, thoroughly reliable and efficient in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the attachment showing the same at the bottom of the fence, Figure 2 is transverse vertical section therethrough, Figure 3 is a perspective view of a portion of one of the horizontal bars, Figure 4 is a perspective view of one of the attaching clips.

Referring to the drawing in detail, it will be seen that the numeral 5 denotes wire fence of any preferred construction which is preferably built to terminate a slight distance above the ground, the ground line being indicated at 6. My attachment is disposed at the lower edge of the fence 5 and includes an upper horizontal bar 7 and a lower horizontal bar 8 disposed in spaced relation thereto. These bars 5 are provided with a plurality of apertures 9. Inverted U-shaped pickets 10 have their legs or side portions slidable through the apertures 9 as is clearly indicated in Figure 2. The lower ends of these pickets will be imbedded in the ground. The bars 7 and 8 are held in a predetermined spaced relation by bars 11 which have lateral end extensions 12 formed with apertures 13 for registering with some of the apertures 9 and receiving some of the legs of the pickets 10. U-shaped clips 14 are provided with registering apertures 15. These clips are engaged with the fence 5 at the bottom edge thereof as is indicated at Figure 2 and the sides of the clips straddle the upper lateral extensions 12 and the upper bar 7 and said some of the side portions of the pickets 10 pierce the apertures 15 thereby holding the clips in place.

As a chicken scratches in the ground adjacent any one picket it may be seen that if a hole is dug sufficiently deep, the picket will sink down therein thereby preventing the escape of the chicken or other chickens under the fence.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

An attachment of the class described, comprising a pair of parallel spaced bars having apertures, a plurality of spacing members extending transversely of the bars and having lateral extensions provided with apertures to register with some of the first-mentioned apertures, U-shaped clips straddling one of the bars and the lateral extensions thereon and having apertures registering with the apertures of said last-mentioned lateral extension and the registering aperture of the last-mentioned bar, a plurality of pickets of an inverted U-shaped formation having their sides slidable through the apertures of the bars and the apertures of the clips and offset ends of the spacing members.

In testimony whereof I affix my signature.

HARRY STACY SMALL.